(No Model.)
G. W. DITHRIDGE.
CENTER BEARING FOR CAR TRUCKS.
No. 380,870. Patented Apr. 10, 1888.
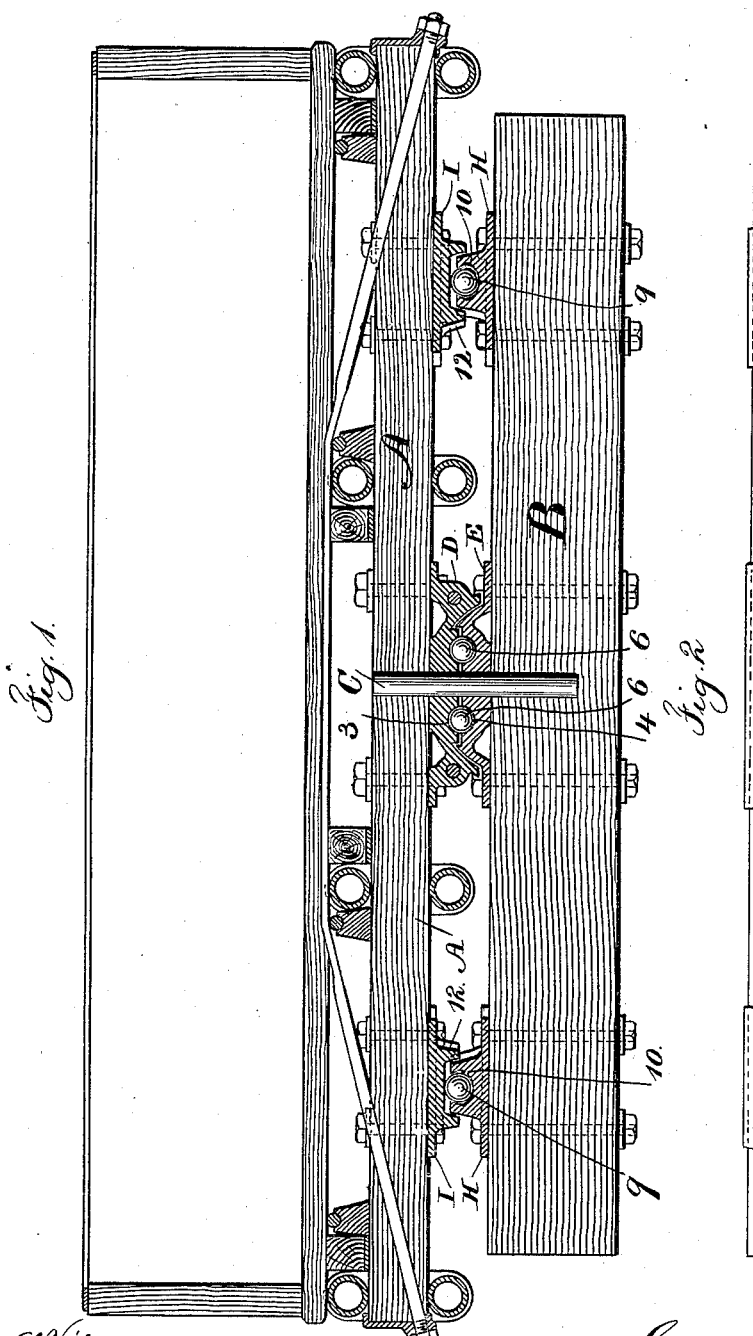 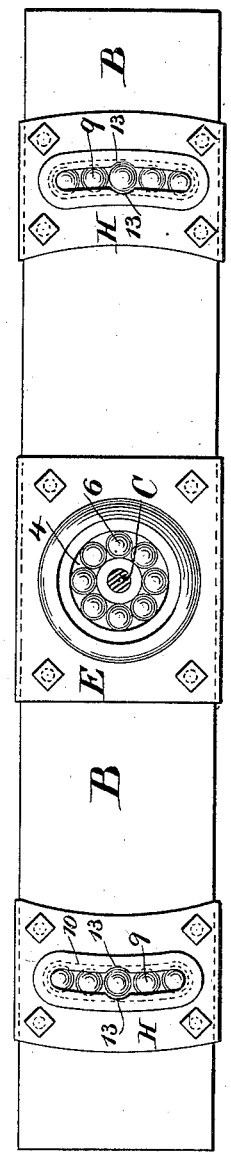
Witnesses
Chas. H. Smith
J. Staib
Inventor
George W. Dithridge.
per Lemuel W. Serrell
Atty

UNITED STATES PATENT OFFICE.

GEORGE W. DITHRIDGE, OF NEW YORK, N. Y.

CENTER BEARING FOR CAR-TRUCKS.

SPECIFICATION forming part of Letters Patent No. 380,870, dated April 10, 1888

Application filed August 26, 1887. Serial No. 247,900. (No model.)

*To all whom it may concern:*

Be it known that I, GEORGE W. DITHRIDGE, of the city and State of New York, have invented an Improvement in Center Plates and Side Bearings for Railway-Cars, of which the following is a specification.

In railroad-cars it is usual to provide a king-bolt and central bearing that connect the car-body to the truck so that the truck may turn or swivel beneath the car, and also to provide side bearings in the form of segmental plates that allow the truck to turn, but prevent the weight of the car bending the king-bolts. In these cases the friction upon the surface is very great, because of the weight and the difficulty in introducing and retaining lubricating material at the proper places.

The king-bolt plates have been made with grooves receiving steel balls, but the grooves have been open at the outer edges and became filled with dust; and grooved arc bearings with balls have also been employed upon the truck-bearer, but the balls are liable to be forced out of the ends of the grooves. My improvements are made for overcoming both these difficulties by inclosing the groove of the king-bolt plates to prevent the access of dust and at the same time relieve the king-bolt from lateral strain, and the arc grooves are narrowest at their upper edges, except in the middle, where the balls are dropped in, so that said balls cannot escape.

In the drawings, Figure 1 is a vertical section of a car through the transom-beam, showing the improved king-bolt bearing and side bearings; and Fig. 2 is a plan view showing such bearings and a portion of the truck-frame.

The truck-frame and the transom-beam of the car-platform may be of either wood or metal. I have shown the transom-beam at A and a portion of the truck-frame at B. The king-bolt C passes through the upper and lower king-bolt plates, D and E, and such king-bolt plates are adapted to rest against and be bolted to the transom-beam and the truck-frame, respectively, and the said king-bolt plates are sectionally of the shape represented—that is to say, the lower plate, D, is recessed downwardly to receive the downward projection from the upper plate and the middle portions of the plates are arched upwardly around the king-bolts, and there are annular grooves at 3 and 4 in the respective adjacent surfaces, which grooves are semicircular in sectional shape, so as to receive the steel or other hard-metal balls 6, which support the weight and roll freely as the respective king-bolt plates turn when the truck enters or leaves a curve in the track, and the lower groove will hold sufficient oil or lubricating material to keep the balls thoroughly lubricated. By making the upper king-bolt plate extend down outside the upward projection on the lower plate the balls are effectually inclosed and dust is excluded, and any lateral strain is taken against the plates where they come together around outside the groove for the balls. The side bearings are made of the arc-shaped plates H and I, the plate H resting upon the bolster of the truck and the plate I being fastened to the transom-beam, and the center from which these arcs are described is the king-bolt. In the lower bearing, H, is a deep groove, 10, for the reception of the balls 9 and of lubricating material, and the plate I is flat, or nearly so, and rests upon the balls, and these balls receive a large portion of the weight of the car and prevent the car tipping if there is more weight upon one side than upon the other. The bearing-plates have bases sufficiently broad to bear with uniformity upon the truck-frame and platform-frame, respectively, and the flanges 12, upon the top plate, I, extending down at the sides of the base or lower plate, H, serve as guides to the parts as they swing and exclude dust, and there is very little friction, in consequence of the balls being almost immersed in lubricating material, and these balls cannot escape at the end of the bearing-plate H, because the groove in such bearing-plate comes above the center or axis of the anti-friction balls, and I make the groove narrower at the top than the diameter of the balls, as shown, and there is an opening in the middle at 13 that is large enough for dropping the balls down into the groove. This prevents the risk of the balls being thrown out at the ends, especially when turning curves.

I claim as my invention—

1. The combination, with the king-bolt and the truck-frame and transom-beam, of the king-bolt plates fastened to the respective parts and having annular grooves and hard-metal balls within the grooves, the upper king-bolt plate extending down around the lower king-bolt plate outside the groove for the balls, substantially as set forth.

2. The combination, with the truck-frame and transom-beam, of segmental side bearing-plates, each lower plate being grooved and hard-metal balls introduced into the grooves through central openings, the end upper portions of the grooves being narrower than the diameter of the balls, substantially as set forth.

Signed by me this 16th day of August, A. D. 1887.

GEO. W. DITHRIDGE.

Witnesses:
JOSEPH SHACKLETON,
R. M. CUSHMAN.